US007222454B1

(12) United States Patent
Chen

(10) Patent No.: US 7,222,454 B1
(45) Date of Patent: May 29, 2007

(54) APPARATUS AND METHOD FOR WATERING A HOUSEPLANT

(76) Inventor: Carl Wan-Cheng Chen, 165 Tenby Ter., Danville, CA (US) 94506

( * ) Notice: Subject to any disclaimer, the term of this patent is extended or adjusted under 35 U.S.C. 154(b) by 105 days.

(21) Appl. No.: 10/894,465

(22) Filed: Jul. 19, 2004

(51) Int. Cl.
*A01G 27/00* (2006.01)

(52) U.S. Cl. ...................................................... 47/48.5

(58) Field of Classification Search ................ 47/62 R, 47/62 N, 79, 48.5, 40.5
See application file for complete search history.

(56) References Cited

U.S. PATENT DOCUMENTS

| | | | |
|---|---|---|---|
| 2,865,137 A | 12/1958 | Longacre | |
| 2,870,574 A | 1/1959 | Sheridan | |
| 3,534,498 A | 10/1970 | Herrli | |
| 3,758,987 A | 9/1973 | Crane, Jr. | |
| 3,775,904 A | 12/1973 | Peters | |
| 4,016,677 A | 4/1977 | Julinot | |
| 4,300,311 A * | 11/1981 | Marchant | 47/62 R |
| 4,329,815 A | 5/1982 | Secrest | |
| 4,335,540 A | 6/1982 | Allen | |
| 4,447,983 A | 5/1984 | Shinada | |
| 4,653,529 A | 3/1987 | Freeman | |
| 4,796,017 A * | 1/1989 | Merenda | 340/620 |
| 4,805,342 A | 2/1989 | Jenkins et al. | |
| 4,819,375 A | 4/1989 | Baumgartner et al. | |
| 4,848,029 A | 7/1989 | Han | |
| 4,864,711 A | 9/1989 | Yokota | |
| 4,885,870 A | 12/1989 | Fong | |
| 4,916,858 A | 4/1990 | Hobson | |
| 4,937,972 A | 7/1990 | Freitus | |
| 4,961,285 A * | 10/1990 | Jenkins et al. | 47/79 |
| 5,009,028 A | 4/1991 | Lorenzana et al. | |
| 5,097,626 A | 3/1992 | Mordoch | |
| 5,315,787 A | 5/1994 | Schleicher et al. | |
| 5,502,924 A | 4/1996 | Lee | |
| 5,511,341 A | 4/1996 | Payne | |
| 5,634,342 A | 6/1997 | Peeters et al. | |
| 5,749,170 A | 5/1998 | Furuta | |
| 5,848,494 A | 12/1998 | Spelt | |
| 5,956,893 A | 9/1999 | Harrison | |
| 5,956,899 A | 9/1999 | DiOrio | |
| 5,992,092 A | 11/1999 | Furuta | |
| 6,108,970 A | 8/2000 | Ball | |
| 6,134,833 A | 10/2000 | Bachman et al. | |
| 6,901,698 B2 * | 6/2005 | Manning | 47/48.5 |
| 2002/0116870 A1 * | 8/2002 | Chen | 47/48.5 |

* cited by examiner

FOREIGN PATENT DOCUMENTS

GB          2.176.382          12/1986

*Primary Examiner*—T. Nguyen
(74) *Attorney, Agent, or Firm*—Michael I Kroll

(57) ABSTRACT

An automated plant watering device and method of watering for use with any existing planter 20 wherein a digital timer 12 is used to set the days, times and duration of watering for the associated plant 14. The water 26 is transferred from a reservoir 18 to the soil in the planter 20 via a small submersible pump 28 disposed within the reservoir. A sensor 16 disposed within the reservoir 18 detects a low water condition and activates a visual 34 and/or audible 36 alarm to alert the user that the reservoir needs to be refilled. An auxiliary reservoir 38 may be used to feed the primary reservoir 18 via a siphon hose 42 when the caretaker anticipates being absent for a prolonged period and would be unable to refill the reservoir when needed. An additional element of the present invention includes an aerator 40 that will emit a fine mist to the leaves of the plant during the winter months. An additional element of the present invention is a splitter 45 to water multiple planters.

2 Claims, 6 Drawing Sheets

PLACING THE UNIT INTO THE OPERATING AREA, PREFERABLY ONE PROXIMAL TO THE PLANTER.

PLUGGING THE POWER CORD INTO AN ELECTRICAL OUTLET.

EXTENDING THE DISCHARGE LINE TO THE PLANTER SO THE SOAKER HOSE IS CONTAINED ENTIRELY THEREIN AND LYING ON THE SOIL.

ANCHORING THE SOAKER HOSE TO THE SOIL.

FILLING THE RESERVOIR WITH WATER.

SETTING THE WATERING OPERATION DAYS ON THE DIGITAL TIMER.

SETTING THE START TIME FOR WATERING ON THE DIGITAL TIMER.

SETTING THE FINISH TIME FOR WATERING ON THE DIGITAL TIMER.

REFILLING THE RESERVOIR WITH WATER AS NEEDED.

FIG. 6

APPARATUS AND METHOD FOR WATERING A HOUSEPLANT

BACKGROUND OF THE INVENTION

1. Field of the Invention

The present invention relates generally to watering devices and, more specifically, to a method and apparatus for watering houseplants wherein a digital timer and a pump are used to transfer water from a remoter reservoir to the soil in a planter in which a houseplant resides. The timer sets the time and duration for watering as well as on what days watering is to take place.

Caring for houseplants requires a specific watering schedule that varies from plant to plant. Some plants need to be watered each day and others only need water a few times a week thereby requiring the caretaker of the plant to pay attention to multiple schedules when a plurality of plants are being taken care of since overwatering or underwatering houseplants puts the health of the plants at risk and could kill them. Furthermore, the absence of the caretaker for any duration requires having someone else care for the plants and hope that they are diligent regarding the watering schedule for each plant. The health of the plants is important because they bring beauty to the area they are in, enhance the quality of the air, are the result of nurturing over a period of time and are often quite expensive to purchase.

The present invention seeks to overcome the shortcomings of the prior art by introducing an automated plant watering device and method of watering for use with any existing planter wherein a digital timer is used to set the days, times and duration of watering for the associated plant. The water is transferred from a reservoir to the soil in the planter via a small submersible pump disposed within the reservoir. A sensor disposed within said reservoir detects a low water condition and activates a visual and/or audible alarm to alert the user that the reservoir needs to be refilled. An auxiliary reservoir may be used to feed the primary reservoir via a siphon hose when the caretaker anticipates being absent for a prolonged period and would be unable to refill the reservoir when needed. A splitter may be used to water two planters simultaneously.

An additional element of the present invention includes an aerator that will emit a fine mist to the leaves of the plant during the winter months when plants most frequently die because of the low humidity in the air. The aerator will compensate for the lack of humidity and help provide year round plant care capabilities wherein the user only has to fill the reservoir when needed and add nutrients to the soil occasionally.

2. Description of the Prior Art

There are other watering devices designed for watering plants, while these watering devices may be suitable for the purposes for which they were designed, they would not be as suitable for the purposes of the present invention, as hereinafter described.

U.S. Pat. No. 4,329,815

Inventor: Allen D. Secrest

Issued: May 18, 1982

An improved self controlled watering planter device of the type utilizing a porous moisture sensor, an air-tight fluid reservoir and a membranous fluid inlet port on the interior bottom of the device including concentric annular ridges and a solid circular disk for inhibiting the interference of plant roots with the fluid inlet port. The improved device further includes baffle structures to inhibit debris from fouling the bottom portion of the inlet port, an interiorally mounted moisture sensing unit and an inward draining niche surrounding the fluid reservoir fill port.

U.S. Pat. No. 4,335,540

Inventor: Ron P. Allen

Issued: Jun. 22, 1982

A water reservoir defining plant container that has a manually actuated pump operatedly associated therewith, which pump when actuated by the user discharges a fine mist or spray on the soil and plant situated in the container. The container has ports in the lower portion thereof through which excess water in the soil in the container may drain into a shallow dish situated below the container. The dish is preferably in removable engagement with the container, to prevent inadvertent separation of the container and dish, when the container is moved from a position it normally occupies.

U.S. Pat. No. 4,47,983

Inventor: Junji Shinada

Issued: Jan. 3, 1983

An apparatus for irrigating plants includes a planter having a container for a growing medium. A liquid reservoir is below the container. There are openings between the reservoir and the container, permitting a flow of liquid from the reservoir to the container. A filler conduit communicates with the reservoir. A float chamber is near the top of the reservoir. A float chamber conduit extends from the reservoir to the float chamber. There is a float in the float chamber and a normally closed air valve is operatively connected to the float so the float opens the valve when liquid from the reservoir rises in the float chamber. There may be an air conduit connected to the valve so pressurized air from the air conduit is discharged when the valve opens. There may be a closed liquid container normally positioned below the planter. A liquid conduit communicates with the insides of the container near the bottom thereof and is connected to the filler conduit. There may also be an air pump for pressurizing the liquid container.

U.S. Pat. No. 4,653,529

Inventor: Geoffrey W. Freeman

Issued: Mar. 31, 1987

An intermittently operating watering device has a water reservoir for supplying successive flows of water to a pair of receptacles which are separated from one another by a weir. The water also flows into an air space where it covers the lower end of an air passage communicating with an air space at the top of the interior of the water reservoir so that, each time evaporation of the water uncovers the lower end of the air passage to allow the inflow of air, water is able to flow out from the water reservoir to the receptacles. The reservoir is in one of the receptacles and a plant in the other receptacle is irrigated at successive intervals of time.

U.S. Pat. No. 4,805,342

Inventor: Wayne C. Jenkins et al.

Issued: Feb. 21, 1989

Plant irrigation apparatus is provided with a reservoir. Water is placed inside the reservoir filling a portion of its volume. A pressurized gas is also introduced into the reservoir. The water is forced by the gas pressure out of the reservoir through at least one outlet conduit communicating with the water in the reservoir. Water leaves the outlet conduits through at least one discharge outlet. The apparatus can include structure for hanging the apparatus from a plant grow pot. Pressure indicating structure can also be provided.

U.S. Pat. No. 4,937,972

Inventor: Joseph P. Freitus

Issued: Jul. 3, 1990

Self-contained plant growth systems include a three-compartment plant growth chamber having an upper compartment for holding soil or vermiculite, an intermediate reservoir compartment for storing fluid—such as a plant growth solution—and a lower compartment housing a pump and electric power source. Responsive to signals from a water sensor in the upper compartment, the pump is activated for pumping a metered quantity of growth solution along a feeder tube from the reservoir compartment to the upper compartment. Drainage is provided from the upper compartment to the reservoir. A vent tube vents air to and from the reservoir during emptying and filling operations. An on/off switch selectively de-activates the pump, and the chamber can include elements for displaying reservoir fluid level.

U.S. Pat. No. 5,097,626

Inventor: Yakov Mordoch

Issued: Mar. 24, 1992

An automatic self-watering system for plants growing in a container includes a water receptacle above the level of growing medium in the container. The water container may be of any appropriate shape, and may be attached to or located adjacent an upper edge of the container. Alternatively, the water container may have legs resting on or inserted in the growing medium, or may be hooked onto the edge of the container. The water receptacle may be formed separately from or integrally with the container. A conduit for transporting water is connected to an outlet in the side or base of the water receptacle and the conduit is engaged with a dryness sensor inserted in the growing medium in the container. The dryness sensor automatically closes the conduit when the growing medium is adequately irrigated, and opens the conduit to allow water to drip onto the growing medium when water is needed. The outlet from the conduit is positioned so that water drips, by gravity, onto the root area around a plant growing in the container. The container may also be used for holding a separate pot for a plant which fits in the container.

U.S. Pat. No. 5,502,924

Inventor: John C. Lee

Issued: Apr. 2, 1996

A self-watering and self-drying planter assembly with a water reservoir open to the air and a top downward system for supplying water into the soil through built-in water-feeding channels, each having a water-transfer control lever for controlling the quantity of water supplied to the soil in the planter. The planter assembly automatically controls the amount of water and nutrients supplied to said plant by controlling the periods of water feeding and the intervening dry periods. There is an inner container assembly including an inner container for receiving a plant and soil, an outer container spaced from and surrounding the inner container and defining therebetween a water-receiving chamber, and a water-supplying chamber below for receiving water from said water-receiving chamber. A float assembly automatically supplies water from the water-receiving chamber to the water-supplying chamber in response to the water level in said water-supplying chamber. The water-feeding channels are connected to the water-supplying chamber for transferring water from the water-supplying chamber to the water-feeding channels for watering the plant.

U.S. Pat. No. 5,511,341

Inventor: Jessica Payne

Issued: Apr. 30, 1996

An automatic house plant watering system is provided allowing the user to control a constant slow flow of irrigating water to house plants during the extended absence of the user. User adjustable valves control the gravity outflow of water from a reservoir in the preferred embodiment, and a perforated threaded reservoir fill plug having a central bore for air pressure regulation is used to expose the fill hole and also for controlling atmospheric air inflow to the reservoir as an additional means of controlling the outflow of water. The user thus control irrigation flow by adjusting the at least one outflow valve and also by adjusting air inlet through the threaded fill plug. Conical ridged nipples on the at least one irrigation water outflow valve provides a friction fit for suitable flexible tubing to conduct water to individual plants to be watered. The present invention may be provided with casters, pull handles, a rolling cart, an air pump for positive reservoir air pressure, and a lamp mounting bracket.

U.S. Pat. No. 5,634,342

Inventor: John P. Peeters

Issued: Jun. 3, 1997

A compact electronic device automatically waters household plants by collecting ambient air moisture. The device utilizes the Peltier effect to condense atmospheric moisture which is used in a controlled manner to supply water to a plant. The device includes a thermoelectric module, a microcontroller, a micro-fan, a moisture sensitive probe and an external power supply.

U.S. Pat. No. 5,749,170

Inventor: Mikio Furuto

Issued: May 12, 1998

An automatic water supply device comprises a pot-shaped case having a space enclosing a flowerpot in the inside, a supporting bed of reverse bowl shape enclosed in the case and holding the flowerpot thereon, a control unit arranged in a gap between the inside of the case and the flowerpot and containing at least an air pump, a controller and a timer, an air tube connected to outlet side of the air pump and having a front end part communicating with the inside of the supporting bed, and a device to exhaust air in the supporting bed when the supplying water is finished. Since the water supplying device basically has simple structure that a supporting bed of reverse bowl shape is inserted from the upper side and enclosed in the case, a part storing water can be taken to pieces and inspection or cleaning is easy. Also since the control unit is arranged between the inside of the case and the flowerpot, it can be easily detached and when the casing of the unit is made the waterproof structure, it can be used in enclosing in any position in the case without trouble. Further since all parts including the control unit are enclosed in the case, mechanical parts are not exposed or projected and good appearance can be secured. Also noise of the air pump can be prevented from being dispersed to the outside.

U.S. Pat. No. 5,848,494

Inventor: Jacob Spelt

Issued: Dec. 15, 1998

A fluid control apparatus is for controlling water supply to a potted plant and has a main valve responsive to weight of the potted plant. The apparatus comprises a main body to support the load of the plant, a valve body adapted to be suspended from a support, and a resilient member cooperating with the main body and valve body to be responsive to load of the plant acting on the main body. A delivery conduit receives water under relatively low pressure and flow of the water is controlled by the main valve. The main valve has a first valve portion, e.g. a valve seat on the valve body, and a second valve portion, e.g. a poppet valve. A valve adjuster, a critical valve area, and water pressure determine actuation of the main valve. Preferably, the main valve closes when load acting on the apparatus is a pre-determined load reflecting weight of the fully watered plant, and as the plant becomes lighter, opening of the valve is delayed to ensure delivery of a relatively large amount of water.

U.S. Pat. No. 5,956,899

Inventor: James J. DiOrio

Issued: Sep. 28, 1999

A self-watering plant device has a reservoir for retaining liquid therein. The reservoir is provided with a venting tube having one end attached to the reservoir and another end carrying a sensing device placed in the soil surrounding the plant for detecting the moisture level therein. The reservoir is further provided with an outlet tube for delivering liquid to the plant in response to the sensing device. The invention is improved such that the venting tube is flexibly displaced so that the sensing device is variably and selectively positioned at different height levels in the soil so as to establish the degree of wetness and dryness in the soil. The outlet tube is installed in the soil adjacent the bottom wall of a pot housing the plant to directly deliver a free flow of liquid to a bottom portion of the plant in response to the moisture level detected by the sensing device.

SUMMARY OF THE PRESENT INVENTION

The present invention discloses an automated plant watering device and method of watering for use with any existing planter wherein a digital timer is used to set the days, times and duration of watering for the associated plant. The water is transferred from a reservoir to the soil in the planter via a small submersible pump disposed within the reservoir. A sensor disposed within the reservoir detects a low water condition and activates a visual and/or audible alarm to alert the user that the reservoir needs to be refilled. An auxiliary reservoir may be used to feed the primary reservoir via a siphon hose when the caretaker anticipates being absent for a prolonged period and would be unable to refill the reservoir when needed. An additional element of the present invention includes an aerator that will emit a fine mist to the leaves of the plant during the winter months when plants most frequently die because of the low humidity in the air.

A primary object of the present invention is to provide an automatic watering device for houseplants that can be set water a plant on selected days and times according to settings input into a digital timer by the user.

Another object of the present invention is to provide an automatic watering device for houseplants wherein water is transferred from a reservoir to the soil in a planter via a small submersible pump disposed within the reservoir that is activated by the digital timer.

Yet another object of the present invention is to provide an automatic watering device for houseplants wherein the submersible pump pushes the water through a solid flexible hose having a length of permeable soaker hose disposed on the distal end thereof.

Still yet another object of the present invention is to provide an automatic watering device for houseplants wherein the soaker hose is disposed on the surface of the soil inside the planter and may be placed circumferentially around the plant to provide full coverage of the underlying root system.

Still another object of the present invention is to provide a splitter enabling the device to water two or more plants simultaneously.

Another object of the present invention is to provide an automatic watering device for houseplants having a low water level sensor to alert the user that the reservoir needs to be refilled.

Yet another object of the present invention is to provide an automatic watering device for houseplants having an auxiliary reservoir to refill the primary reservoir via a siphon hose when the user will be unable to refill the reservoir when needed.

Still yet another object of the present invention is to provide an automatic watering device for houseplants including an aerating means for providing a humidifying mist to the plant. Another object of the present invention is to provide an automatic watering device for houseplants that is simple and easy to use.

Yet another object of the present invention is to provide an automatic watering device for houseplants that is inexpensive to manufacture and operate.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 6 is a flow chart demonstrating the method of operation of the present invention.

LIST OF REFERENCE NUMERALS

Figure 1:
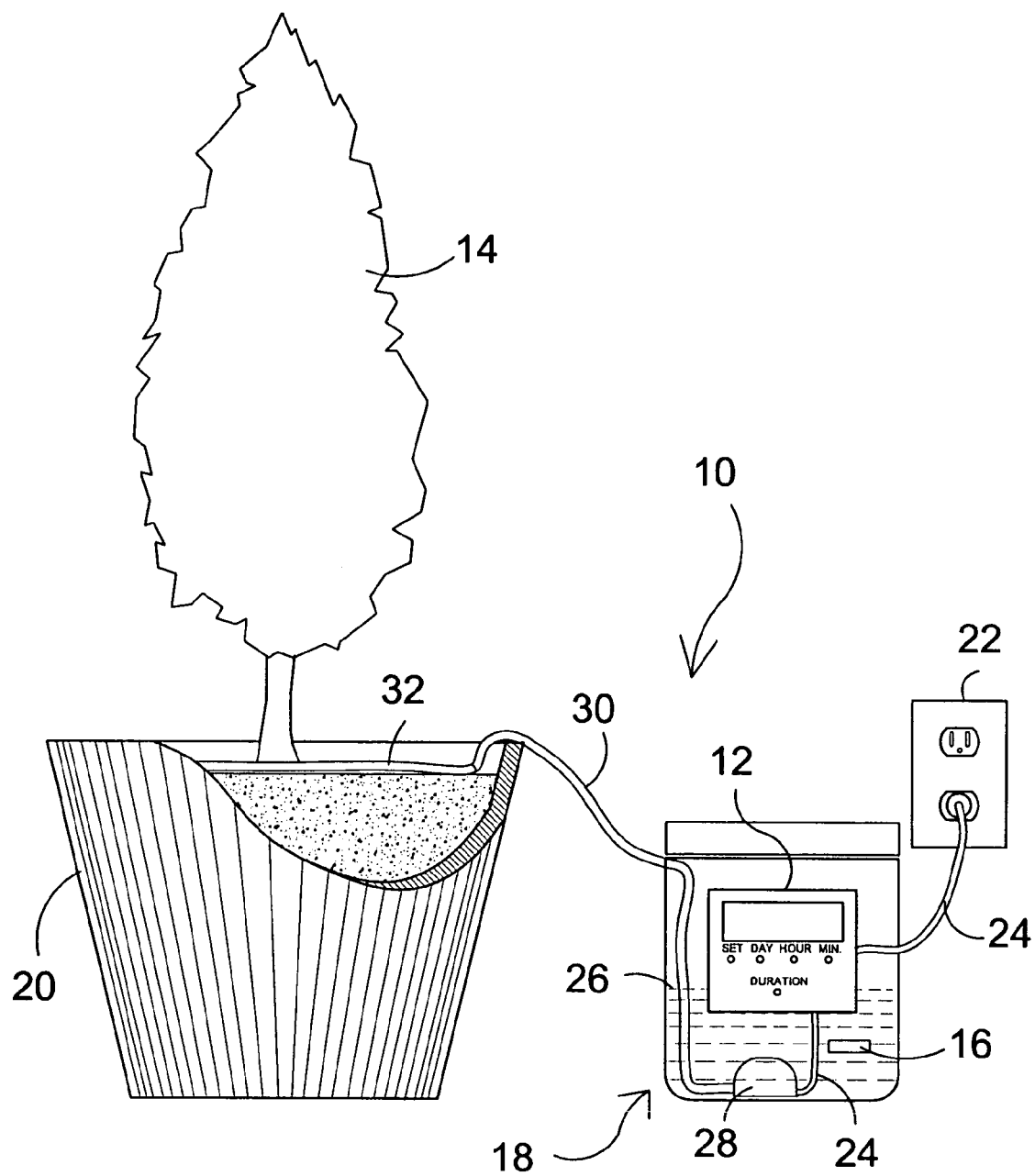
FIG. 1 is an illustrative view of the present invention.

With regard to reference numerals used, the following numbering is used throughout the drawings.

10 present invention
12 timer
14 plant
16 sensor
18 reservoir
20 first pot
21 second pot
22 outlet
24 cord
26 water level
28 water pump
30 discharge hose
32 soaker hose
34 visual alarm
36 audible alarm
38 auxiliary reservoir
40 aerator
42 siphon hose
44 valve
45 splitter

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10. Shown is the houseplant-watering device of the present invention 10 in use. The houseplant-watering device includes a digital timer 12 that enables the user to set a watering cycle for a potted houseplant 14 according to the days, time and duration desired by the user. The device 10 could water the plant 14 every day for a few minutes or on Monday, Wednesday and Saturday or any other such combination. A sensor 16 in the reservoir 18 is provided to detect a low water condition and activate a visual or audible alarm to alert the user that the reservoir needs filling. Also shown is pot 20, power outlet 22, power cord 24, water level 26, water pump 28, discharge hose 30, and soaker hose 32.

Figure 2:
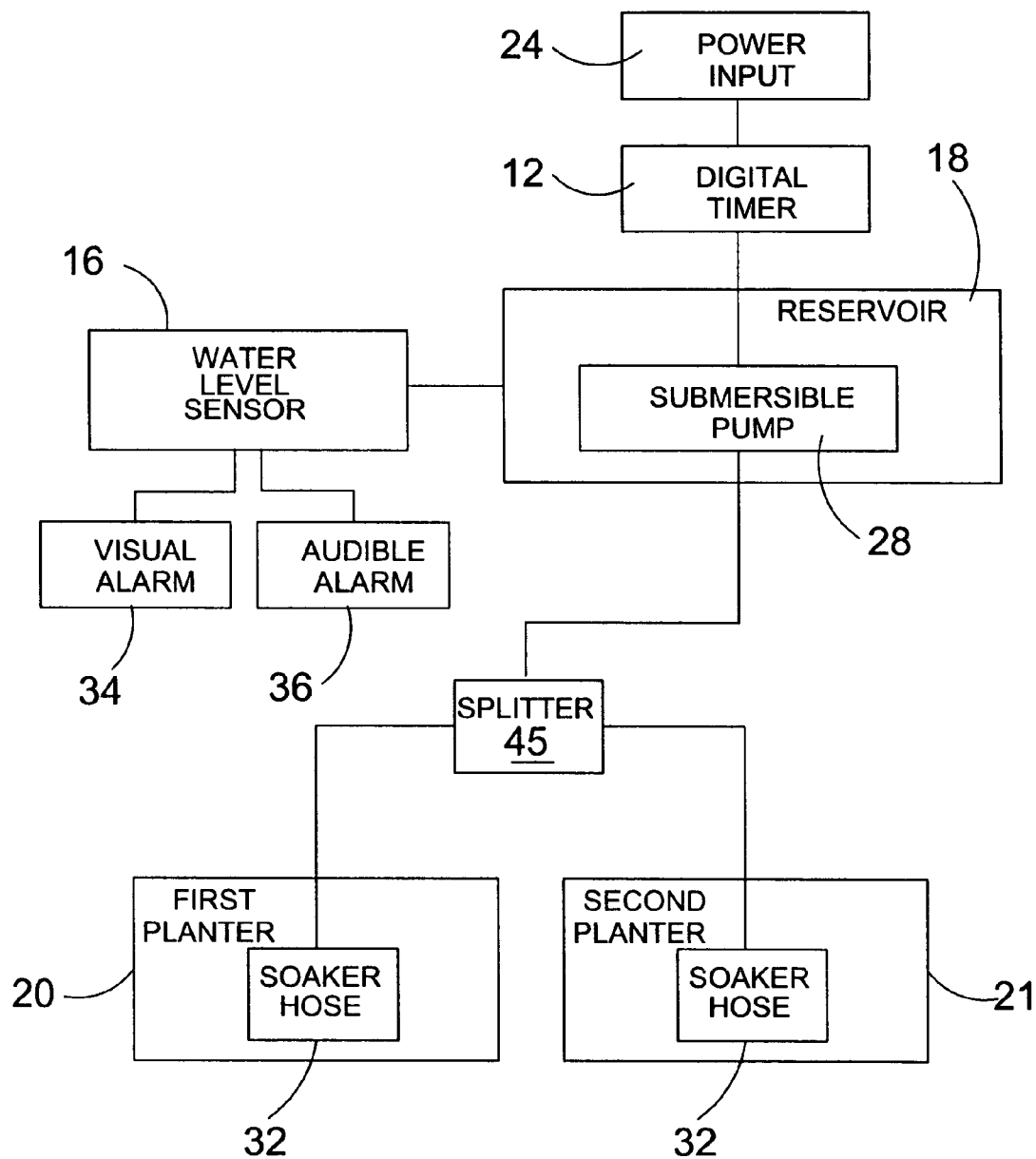
FIG. 2 is a block diagram of the present invention.

Turning to FIG. 2, shown therein is a block diagram of the present invention. Shown are the primary components of the houseplant-watering device of the present invention. The houseplant watering device includes a digital timer 12 that enables the user to set a watering cycle for a potted 20 houseplant according to the days, time and duration desired by the user. The device could water the plant every day for a few minutes or on Monday, Wednesday and Saturday or any other such combination. A splitter 45 can be inserted, enabling the device to water multiple planters 20 simultaneously. A sensor 16 in the reservoir is provided to detect a low water condition and activate a visual 24 or audible 36 alarm to alert the user that the reservoir needs filling. Other previously disclosed elements are also shown.

Figure 3:
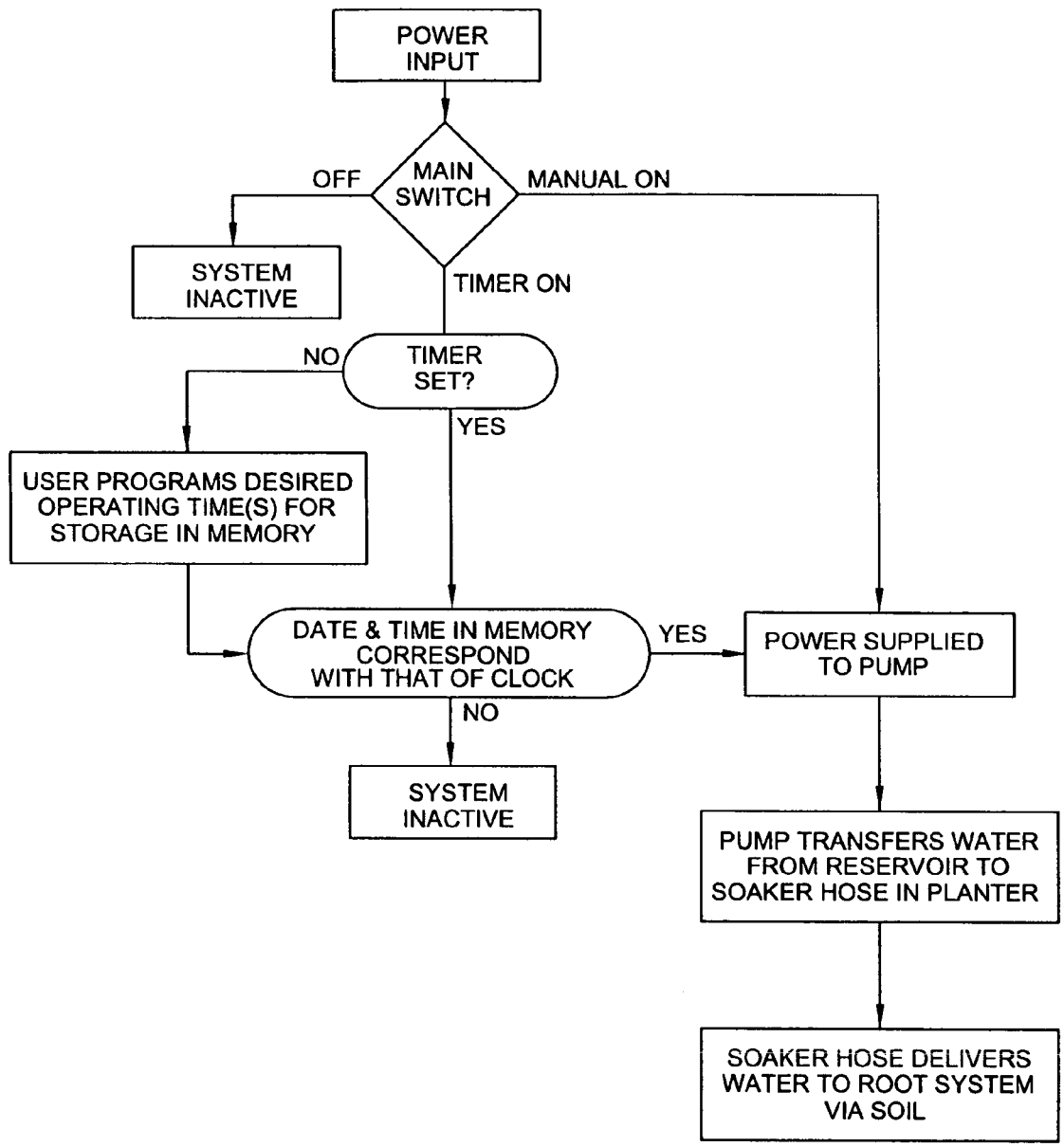
FIG. 3 is a flow chart of the present invention.

Turning to FIG. 3, shown therein is a flow chart of the present invention. Shown is the operation of the primary components of the houseplant-watering device of the present invention. The houseplant-watering device includes a digital timer that enables the user to set a watering cycle for a potted houseplant according to the days, time and duration desired by the user.

Figure 4:
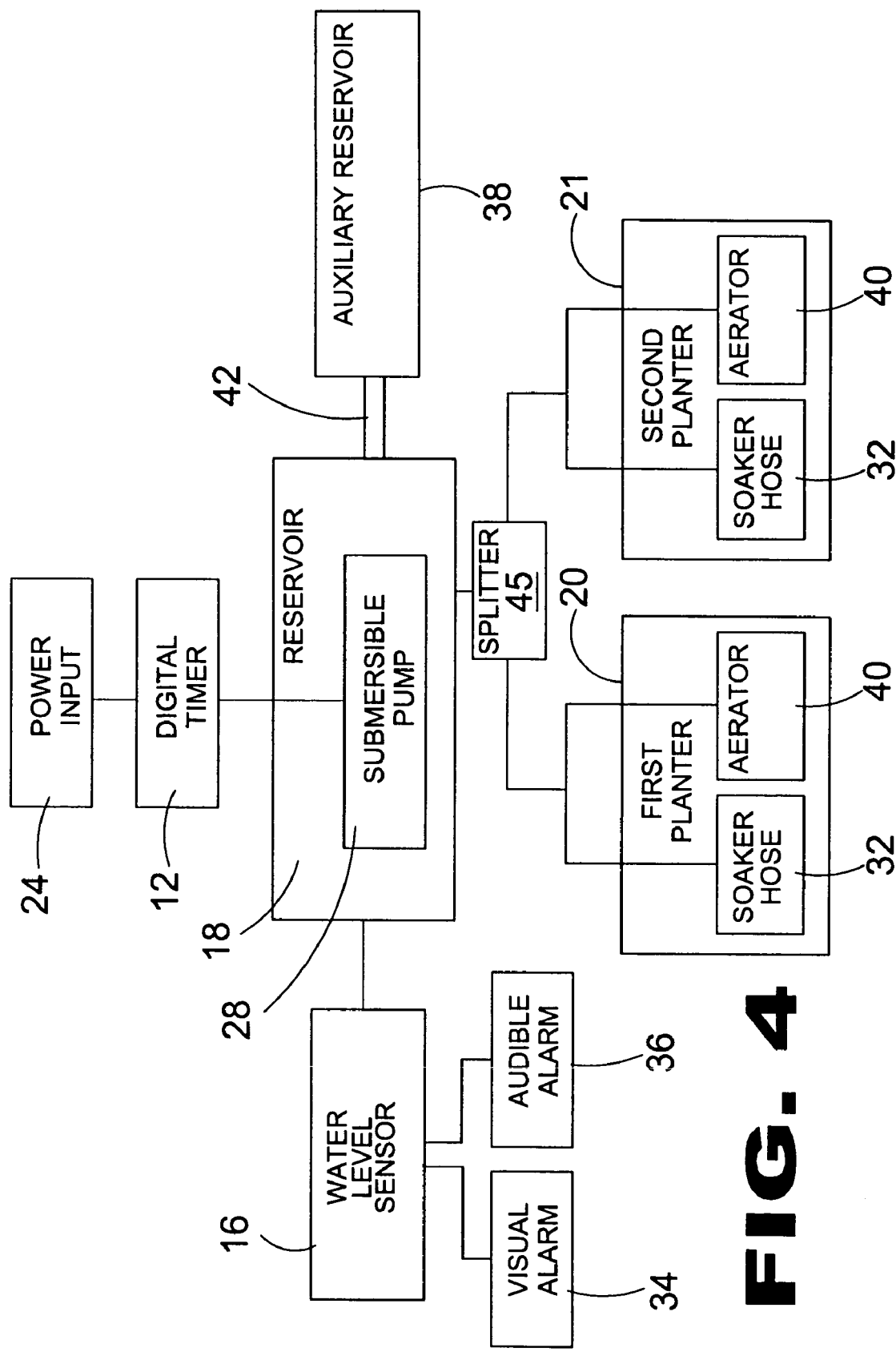
FIG. 4 is a block diagram of the present invention with additional elements.

Turning to FIG. 4, shown therein is a block diagram of the present invention with additional elements. Shown is the houseplant-watering device of the present invention including an auxiliary reservoir 38 and an aerating nozzle 40. The auxiliary reservoir 38 is for use when the person caring for the plants will be absent for a prolonged duration and will be unable to refill reservoir 18 when needed. Water is fed to the reservoir 18 from the auxiliary reservoir 38 via a siphon hose 42 to maintain an even water level therein. An optional aerating nozzle 40 may also be included that will emit a fine mist onto the leaves of the plant. The aerating element 40 may be inline with the soaker hose 32, which can be plugged in during the winter months when there is little humidity in the air. An optional splitter 45 may be used for simultaneous watering of two or more planters 20,21. Other previously disclosed elements are also shown.

Figure 5:
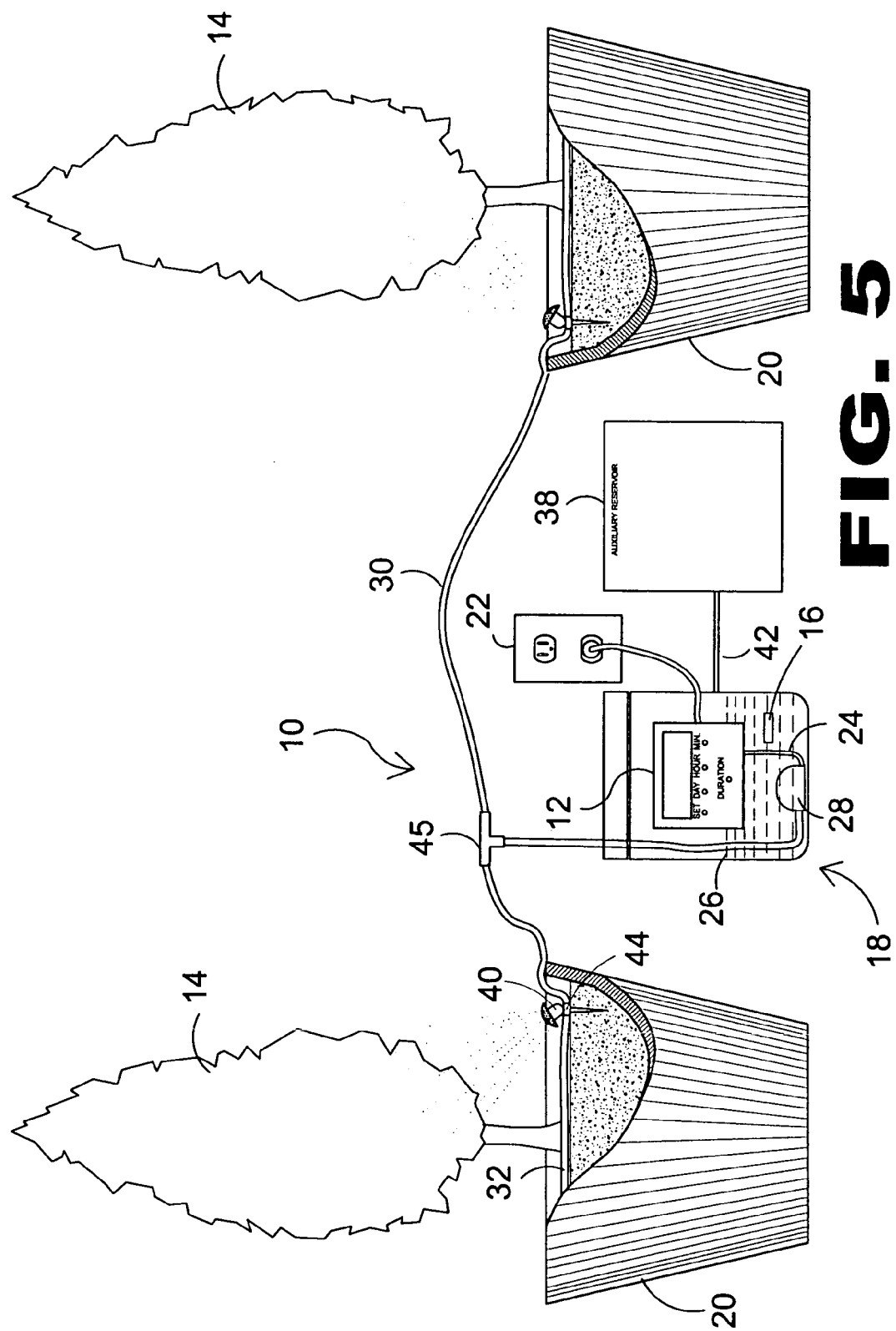
FIG. 5 is a block diagram of the present invention with additional elements.

Turning to FIG. 5, shown therein is a view of the present invention 10 with additional elements. Shown is the houseplant-watering device of the present invention 10 including an auxiliary reservoir 38 and an aerating nozzle 40. The auxiliary reservoir 38 is for use when the person caring for the plants will be absent for a prolonged duration and will be unable to refill reservoir 18 when needed. Water is fed to the reservoir 18 from the auxiliary reservoir 38 via a siphon hose 42 to maintain a constant water level therein. An optional aerating nozzle 40 may also be included that will emit a fine mist onto the leaves of the plant 14. The aerating element 40 with valve 44 may be inline with the soaker hose 32 and be plugged in during the winter months when there is little humidity in the air. The splitter 45 may be used for the present invention 10 to water multiple planters. Other previously disclosed elements are also shown.

Turning to FIG. 6, shown therein is a flow chart demonstrating the method of operation of the present invention. Shown is the method of operation showing the primary steps of setting up and operating the present invention as follows: (1) placing the unit into the operating area, preferably one proximal to the planter; (2) plugging the power cord into an electrical outlet; (3) extending the discharge line to the planter so the soaker hose is contained entirely therein and lying on the soil; (4) anchoring the soaker hose to the soil; (5) filling the reservoir with water; (6) setting the watering operation days on the digital timer; (7) setting the start time for watering on the digital timer; (8) setting the finish time for watering on the digital timer; and, (9) refilling the reservoir with water as needed.

I claim:

1. An apparatus for automatically watering a plant, the plant being disposed in soil in a pot, comprising:
    a) a first reservoir containing watering with which to water the plant;
    b) a pump submerged in said first reservoir for pumping water from said first reservoir to the plant;
    c) a discharge hose from said pump to an upper surface of soil in said pot to permit water to be conveyed from the pump to the plant and a soaker hose connected to said discharge hose deployed about the plant on said upper surface of soil for distributing water about the plant;
    d) a splitter connected to said discharge hose to convey water to two or more planters and an aerator on said upper surface of soil for directing a water spray at leaves on said plant for misting said plant while said plant is being watered, said aerator being inline with and plugged into said soaker when misting is required;
    e) an automatic digital timer on said pump partially submerged in water in said first reservoir for controlling the operation of the watering cycle of the pump to permit water to be pumped to the plant intermittently depending on the watering cycle selected on the automatic timer, and a power cord extending from an external power outlet to said timer, said power cord not being submerged in water within the reservoir,
    f) a water level sensor in said first reservoir for sensing the water level in the first reservoir;
    g) a visual alarm on said water level sensor for giving a visual alarm when the water level of the first reservoir is low;
    h) an audible alarm on said water level sensor for giving an audible alarm when the water level of the first reservoir is low
    i) a second reservoir containing water,
    j) a siphon hose interconnecting said first and second reservoirs for transferring water from said second reservoir to said first reservoir for maintaining water in said first reservoir.

2. The apparatus of claim 1, wherein said pump is an electrical pump.

* * * * *